United States Patent
McIver et al.

[11] 3,713,459
[45] Jan. 30, 1973

[54] REMOVABLE COVERS FOR APERTURES IN PRESSURE VESSELS

[75] Inventors: Robert Faulds McIver, Sandford, Warehan, Dorset; Frederick Albert Leslie Marchbank, Poole, Dorset, both of England.

[73] Assignee: United Kingdom Atomic Energy Authority, London, England

[22] Filed: May 26, 1969

[21] Appl. No.: 827,514

[30] Foreign Application Priority Data

June 10, 1968 Great Britain.....................27,580/68

[52] U.S. Cl. ......................137/357, 52/224, 52/21, 52/220, 220/3
[51] Int. Cl. .............................................E04h 7/20
[58] Field of Search ......52/224, 223 R, 21, 204, 216; 220/3, 55 D; 137/356, 359, 260, 375; E04h/7/20

[56] References Cited

UNITED STATES PATENTS

| | | | |
|---|---|---|---|
| 3,293,139 | 12/1966 | Bellier | 52/224 X |
| 3,301,041 | 1/1967 | Mueller | 52/223 R X |
| 3,353,859 | 11/1967 | Schupack | 52/224 X |
| 3,389,516 | 6/1968 | Ziegler | 52/224 |
| 3,445,971 | 5/1969 | Desmarchais et al. | 52/224 X |

FOREIGN PATENTS OR APPLICATIONS

| | | | |
|---|---|---|---|
| 660,176 | 3/1963 | Canada | 220/3 |
| 1,428,553 | 1/1966 | France | 52/224 |
| 572,667 | 2/1958 | Italy | 52/224 |

Primary Examiner—Alfred C. Perham
Attorney—Larson, Taylor and Hinds

[57] ABSTRACT

A prestressed concrete pressure vessel has penetrations in the wall which should be capable of being closed by removable closure members which offer the same security against fracture as the vessel itself. The invention provides such a closure member which comprises a prestressed concrete portion and bonded thereto a steel portion through which the releasable fastening of the closure member to the pressure vessel is made.

3 Claims, 5 Drawing Figures

PATENTED JAN 30 1973

REMOVABLE COVERS FOR APERTURES IN PRESSURE VESSELS

BACKGROUND OF THE INVENTION

This invention relates to removable covers for apertures in pressure vessels particularly those of prestressed concrete such as used to house nuclear reactors.

As is known, it has been proposed to accommodate both the reactor core and the primary coolant circuit within the confines of a prestressed concrete pressure vessel. In the case of reactor cores cooled by gas, it has further been proposed to utilize the interior of the vessel, or even cavities in its walls, for housing water boilers heated by the primary circuit gas. In order to provide access to these boilers as well as to other pressure vessel internals, a replaceable cover is needed for the opening affording access which cover should, in the case of where the opening gives access to boilers, allow water/steam pipes to pass through it without lowering the standard of safety.

In earlier proposals, the opening in the walls giving access to these cavities were to be fitted with flow restrictors as well as seals, the flow restrictors were intended to preclude the possibility of rapid depressuration of the primary circuit (gas) in the event of a rupture of the cover or of the pressure seals in the cover. This necessarily added to the cost of the construction.

Accordingly it was suggested the sealing cover be combined with the flow restrictor member in a manner such that its failure does not constitute a hazard to safety. To this end, a cover design has been conceived in which the parts were held in compression so that leaks tend to seal themselves and in this respect the cover has the same safety properties as the prestressed concrete pressure vessel wall.

SUMMARY OF INVENTION

According to the present invention there is provided a prestressed concrete pressure vessel for a nuclear reactor core having a wall across which contain full reactor working pressure, means in said wall defining a penetration, a removable closure member closing said penetration, the closure member being in the form of a composite member having as one part a metal plate and as another part a prestressed concrete part, the metal part lying on the high pressure side of the closure member and bonded to the prestressed concrete part so as to form a unit and means securing the closure member to the adjacent part of the pressure part of the pressure vessel wall.

DESCRIPTION OF THE DRAWINGS

In order that the invention may be better understood two covers embodying the invention will now be described with reference to the accompanying drawings in which.

DESCRIPTION OF THE PREFERRED EMBODIMENTS

Figures 1, 2:
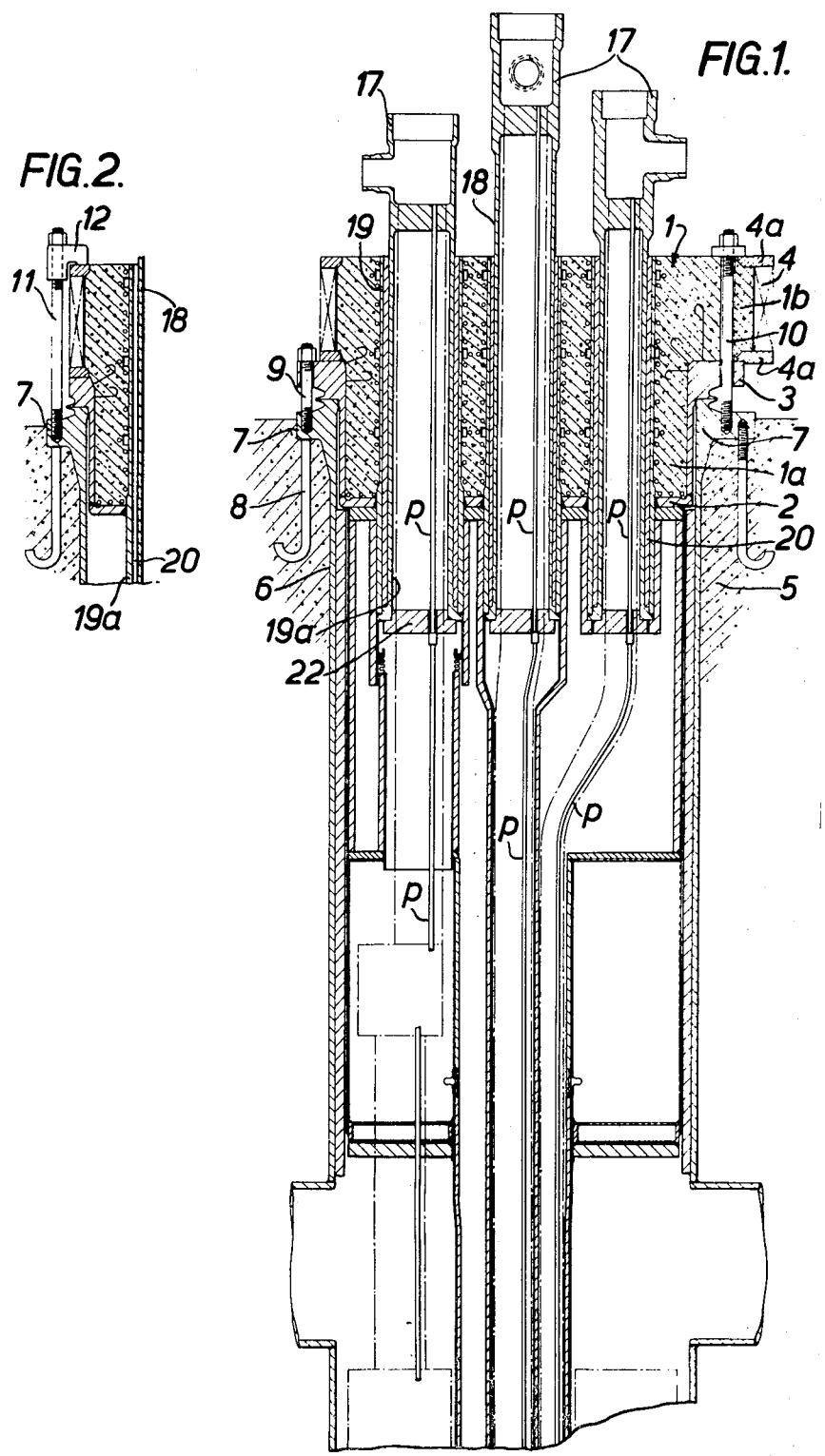
FIG. 1 shows in axial cross section the preferred form of cover referred to as the reentrant type and indicating two different ways of securing it into position.
FIG. 2 is a scrap view showing a further method of attaching the cover.
Figure 1A:
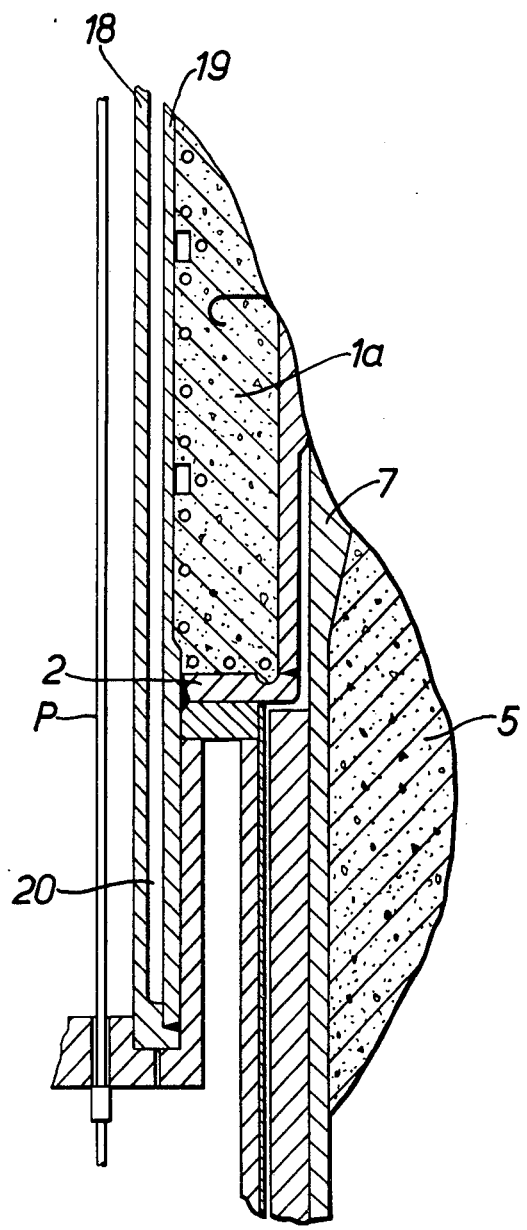
FIG. 1A shows an enlarged view of part of FIG. 1.
Figure 3:
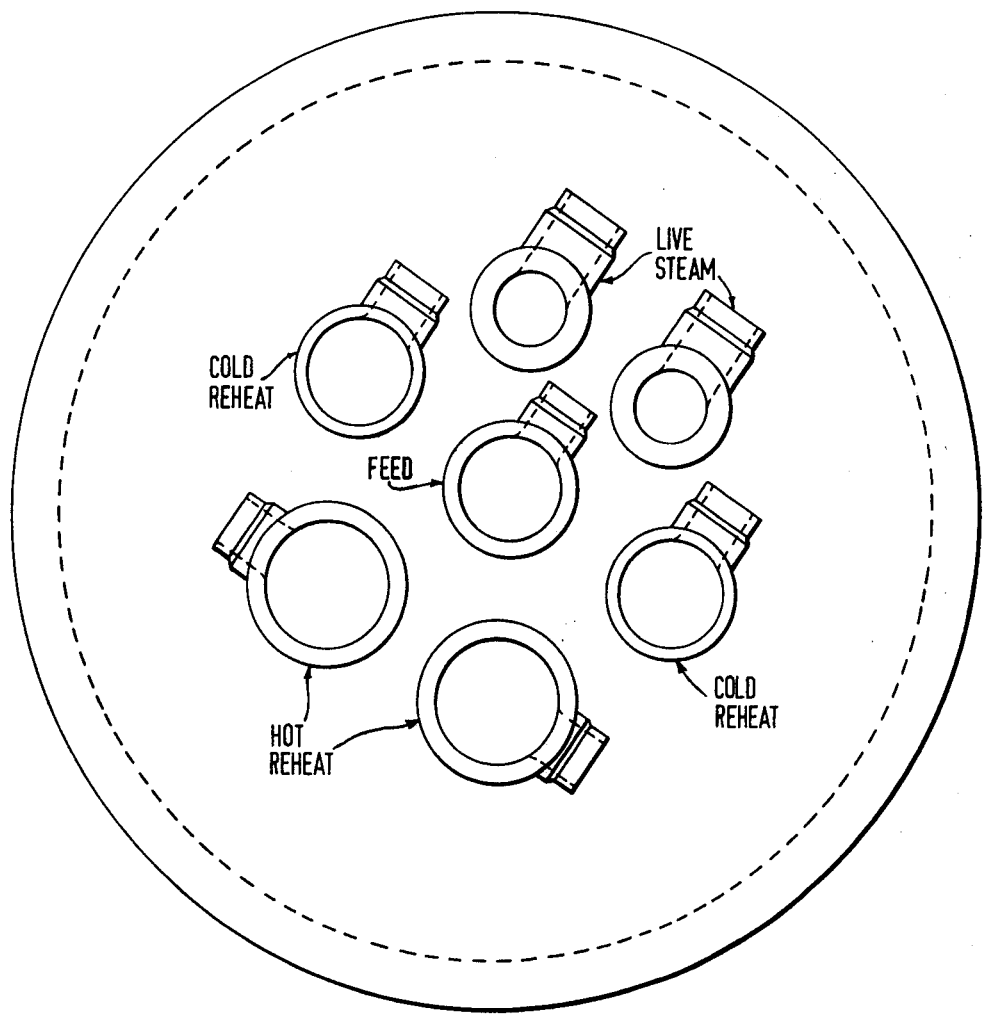
FIG. 3 is a plan view of a typical cover.

In FIG. 1 the closure member or cover comprises a plug 1 of concrete the lower portion 1a of which is of reduced transverse dimension and is bonded to a steel plate 2 which is in the form of a thimble. The latter encloses the base of the plug and the sides of lower portion 1a and terminates in a projecting flange 3 having a row of bold holes as shown. The upper portion 1b of the plug extends upwardly above the flange 3 and is prestressed by means of a cable 4 wrapped round the periphery of the upper portion 1b of the plug, and anchored at its ends to straps 4a in tension.

As shown, the dimensions of the lower portion 1a are such that it can enter, with its bonded thimble plate into the mouth of an opening in a prestressed concrete pressure vessel 5 only a part of which is shown. The opening gives access to the boilers of a gas cooled reactor housed by the vessel and has a tubular lining 6 which terminates at the rim of the cavity in a flange 7. The underside of the flange is keyed to the underlying concrete by J irons 8. Prepared seal faces are formed on the flanges 3, 7 so that a gas tight seal may be made by their engagement.

Two ways of fastening these flanges are shown in FIG. 1. On the lefthand side of the cross section, this is shown to be accomplished by studs 9 which engage holes in both flanges 3, 7 whilst, on the righthand side, longer studs 10 are passed through coincident holes in both concrete portion 1b and the steel plate flange 3 to screw into the flange 7. In the latter case, the portion 1b of the concrete plug is further extended to allow for holes to penetrate the concrete.

In the modified form of securing the cover shown in FIG. 2, the stud 11 passes through a lug 12 which engages the top of the plug 1, whilst at its lower end, the stud is screw-threaded into the flange 7.

As will be seen the lower portion 1a of the cover is circumscribed by the tubular lining 6 of the opening. Only the upper part 1b of the bulk concrete in the cover needs prestressing, for the remainder 1a is to be under compression in operation by virtue of the gas pressure in the vessel acting in any annular clearance between 1a and 6.

The cover being disposed over a boiler housing is required to provide secure through passages for feed water to, and steam from, a boiler located within the pressure vessel. To this end, the cover is penetrated by seven penetrations each lined with its shutter tube 19. Spaced from the tube 19 is a smaller diameter tube 18 and the intervening annulus is fill with heat insulating material 20 both tubes 18, 19 extend below the plate 2 for some distance to form a heat break 19a and there is a plate 22 welded across the tube mouths. Through holes in this plate pass the several pipes p which convey fluid to and from the boilers. The upper part of the tubes 18 serve as headers 17 for the pipes p.

The parts of tubes 18, 19 which extend into the opening will in operation, be put into compression by the pressure of gas contained by the vessel. The tubes 18 themselves are likely to be under tension however and hence their fracture could result in a loss of pressure vessel gas contents. To counter this possibility the plate 22 acts as a gas restrictor at the lower extremity of each tube 18 and serves as a tube plate with respect to feed water or steam tubes which extend through clearance holes in the plate.

The restrictor plates are each mounted so as to rest on internal shoulders at the end of the heat breaks allowing some clearance for freedom of movement of the plate axially. This clearance is intended to compensate for temperature differentials but serves also to assist in equalizing the pressure on opposite sides of the restrictor plate. Should a fracture of a tube 18 occur then the higher pressure below this plate causes it to lift and close the clearance so that the only passages for outflow of pressure vessel contents are the clearances where the water/steam tubes p pass through the plate 22. The plates also limit the up thrust on the headers themselves should the heater 17 become fractured from its branch 18. Finally, the plates may be adapted to limit influx of water into the pressure vessel in the unlikely event of the header tube plate for pipes p being fractured.

Figure 4:
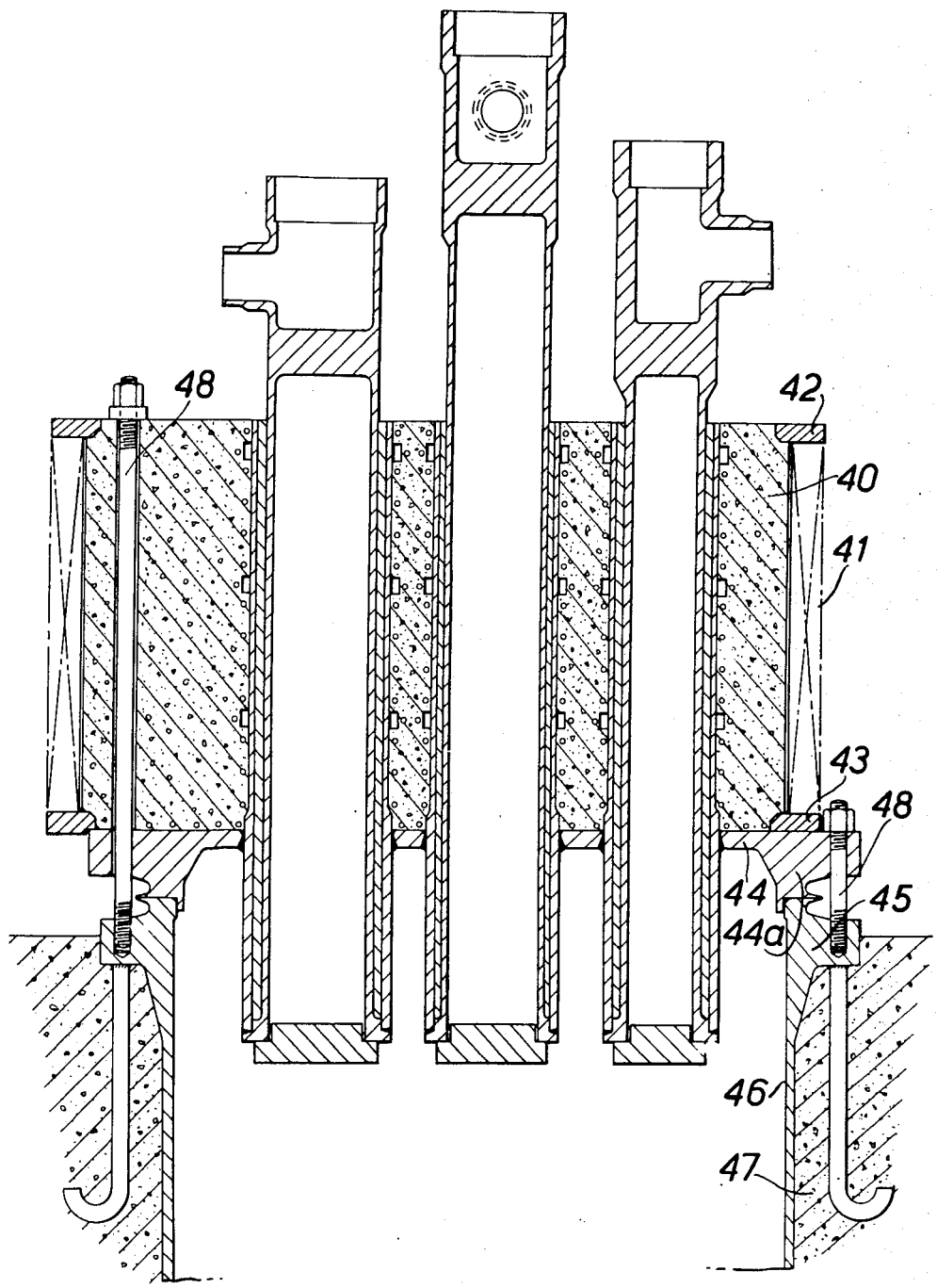
FIG. 4 shows also in axial cross section a modified form of cover with alternative method of attaching it.

The modified form of cover shown in FIG. 4 shows a concrete disc 40 prestressed by means of a cable 41 wrapped round its periphery and anchored at either end to peripheral bands 42, 43. A steel plate 44 is bonded to the underside of the disc and has skirt portion 44a formed with a seal face. The latter engages a complementary face formed on a flange 45 around the rim of a shutter tube 46 which shutters a hole in prestressed concrete pressure vessel 47. The cover is attached to the shutter tube flange 45 by means of studs 48 and these can either pass through holes in the concrete plug and the steel plate as shown on the left hand side of FIG. 4 or merely through holes in the steel plate as shown on the righthand side of the Figure.

We claim:

1. A prestressed concrete pressure vessel for a nuclear reactor core having a wall which contains the full working pressure of the reactor, means in the wall defining a penetration, a removable closure member closing said penetration, the closure member being at least in part prestressed independently of the vessel and having a concrete portion overlying a metal sheet portion which lies on the high pressure side of the member, means securing the closure member to the pressure vessel wall, at least one duct penetrating both metal sheet and the concrete portion, a shutter tube lining the duct and heat break means insulating the interior of the duct from the shutter tube, with a metal plate closing the end of the duct, spaced axially inwardly from the closure member.

2. A prestressed concrete pressure vessel for a nuclear reactor core as claimed in claim 1 in which the duct houses a pipe which is heat insulated from the shutter tube, the pipe and the shutter tube extending coextensively through the metal sheet and terminating in said metal plate, fluid carrying tubes extending in sealed engagement through holes in the metal plate.

3. A prestressed concrete pressure vessel for a nuclear reactor core as claimed in claim 2 in which the pipe protrudes through the shutter tube and from the concrete portion of the closure member a further metal plate closes the outer protruding end of the pipe, the fluid carrying tubes extending in peripherally sealed engagement through holes in said further metal plate.

* * * * *